United States Patent
East et al.

(10) Patent No.: US 6,427,828 B1
(45) Date of Patent: Aug. 6, 2002

(54) CAM-LOCK SEGMENTAL IMPACT IDLER

(75) Inventors: Charles F. East, Van Vleet; Bryan Shane Kelley, Tupelo, both of MS (US)

(73) Assignee: FMC Corporation, Chicago, IL (US)

( * ) Notice: Subject to any disclaimer, the term of this patent is extended or adjusted under 35 U.S.C. 154(b) by 0 days.

(21) Appl. No.: 09/724,317

(22) Filed: Nov. 28, 2000

Related U.S. Application Data

(60) Provisional application No. 60/173,671, filed on Dec. 30, 1999.

(51) Int. Cl.[7] ............................................. B56B 15/08
(52) U.S. Cl. ...................................... 198/826; 198/830
(58) Field of Search ................................. 198/826, 830

(56) References Cited

U.S. PATENT DOCUMENTS

| | | | | |
|---|---|---|---|---|
| 754,335 A | * | 3/1904 | McCabe | 198/826 |
| 809,227 A | * | 1/1906 | Steckel | 198/826 |
| 1,530,499 A | * | 3/1925 | Knode | 198/826 |

OTHER PUBLICATIONS

Trac–Mount®Idler, *Martin Engineering*, pp. 9 and 21, 1997.
Retractable Impact Idlers, *Prok International*, pp. B5–B6.
* cited by examiner Primary Examiner—Joseph E. Valenza
(74) *Attorney, Agent, or Firm*—Pauley Petersen Kinne & Erickson

(57) ABSTRACT

A segmental impact idler with the ability to mechanically lower idler segments is used for easy installation, removal and service of idler segments under loading skirts. The ability to mechanically lower idler segments eliminates a need to use a lifting device or to remove adjacent idlers to access the idler segments. One example of a device that can mechanically lower the segmental impact idler is a locking cam shaft. When the cam shaft is rotated, the idler can be lowered away from the conveyor belt. The idler segments can then easily slide out perpendicular to the direction of the conveyor belt without supporting the weight of the conveyor. The invention is specifically designed to operate in confined spaces. Furthermore, an adjustable mechanical linkage at one end of an idler segment, in conjunction with a pin at a second end of the idler segment, enables the idler segment to be rotatably lowered such that the idler segment can slide underneath the conveyor belt. This feature allows servicing of all of the idler segments from one side of the conveyor belt.

18 Claims, 2 Drawing Sheets

CAM-LOCK SEGMENTAL IMPACT IDLER

CROSS REFERENCE TO RELATED APPLICATION

This application claims the benefit of U.S. Provisional Application No. 60/173,671, filed Dec. 30, 1999.

FIELD OF THE INVENTION

This invention generally relates to simplifying the installation and removal of a segmental impact idler under the loading skirts of a conveyor belt. More particularly, this invention relates to a segmental impact idler that can be installed, removed and serviced underneath the loading skirts of a conveyor belt without the use of a lifting device.

BACKGROUND OF THE INVENTION

Impact idlers are used at loading points in most belt conveyor systems. The loading point is where material falls onto the conveyor belt thereby causing impact loads. Impact idlers are designed to absorb the impact of the falling material without damaging the idler or belting. Since the loads are greater at the loading points, the impact idlers are placed close together to share the impact loads. This allows very little work space for installing, removing or servicing the idlers under loading skirts.

Segmental impact idlers are designed for these tight areas so the idler can be removed in segments perpendicular to the belt. The removal process is difficult since the idler still supports the weight of the conveyor. A lifting device is needed to raise the conveyor belt before the idler segments can be installed or removed.

SUMMARY OF THE INVENTION

This invention provides a segmental impact idler which can be mechanically lowered for easy installation, removal and service of idler segments under loading skirts, thereby eliminating a need to use a lifting device or to remove adjacent idlers to access the idler segments. One example of a device that can mechanically lower the segmental impact idler is a locking cam shaft. The locking cam shaft is built into a frame of a conveyor belt system. When the cam shaft is rotated, the idler can be lowered away from the conveyor belt. The idler segments can then easily slide out perpendicular to the direction of the conveyor belt without supporting the weight of the conveyor. The invention is specifically designed to operate in confined spaces.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
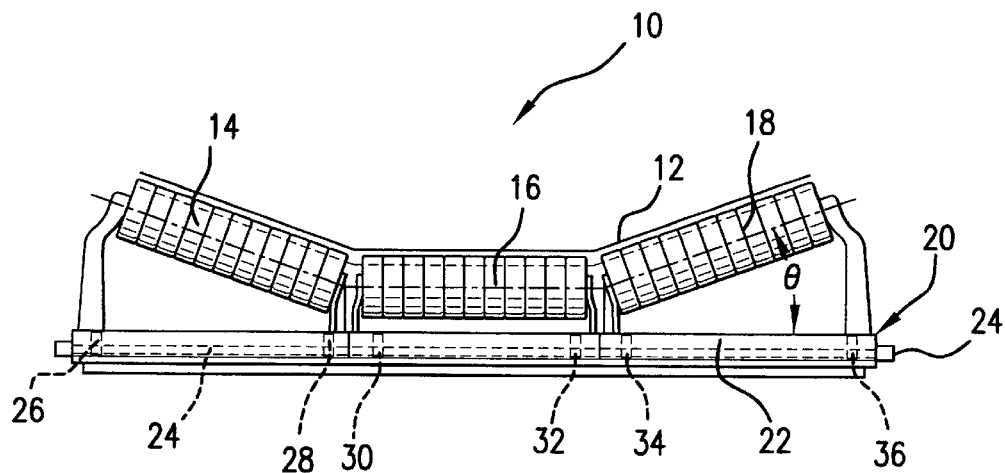
FIG. 1 is a front view of a segmental impact idler of a conveyor belt system using a preferred embodiment of the invention.

FIG. 1 shows a conveyor belt system 10, according to one preferred embodiment of this invention. Segmental impact idlers, shown as three idler rolls 14, 16, 18 mounted individually as segments in FIG. 1, are free to slide on a slider base 20 perpendicular to a direction in which a conveyor belt 12 is moving. Preferably, the idler roll in the center is the center roll 16 and the two idler rolls on either side of the center roll are wing rolls 14, 18. The wing rolls 14, 18 are preferably elevated at their outer ends at an angle θ, wherein θ is preferably in a range of 20° to 45°. The slider base 20 comprises a support frame 22 containing a device for raising and lowering the idler roll segments 14, 16, 18. One example of such a device is a cam shaft 24. The cam shaft 24 is preferably mounted internally within the base 20 and extends a full length of the base 20. Lobes 26, 28, 30, 32, 34, 36 of the cam shaft 24 are located directly under each end of each of the idler roll segments 14, 16, 18.

Figure 2:
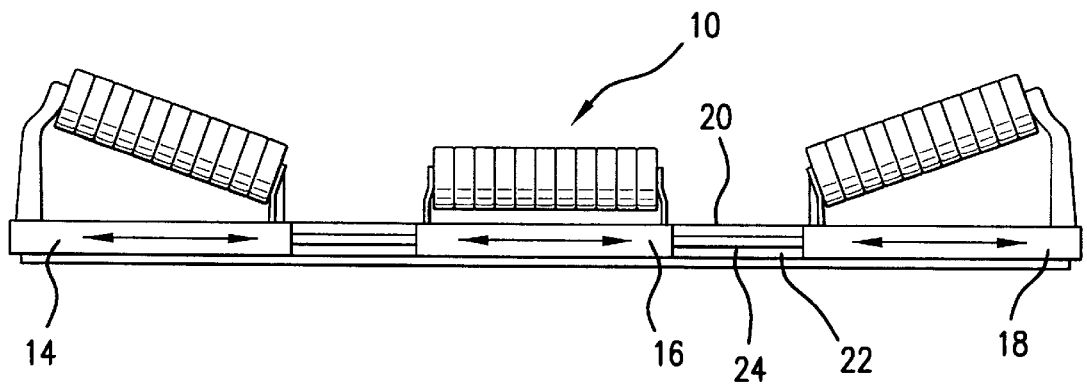
FIG. 2 is a front view of a segmental impact idler of a conveyor belt system using a preferred embodiment of the invention, illustrating the system in a disassembled state.
Figure 3:
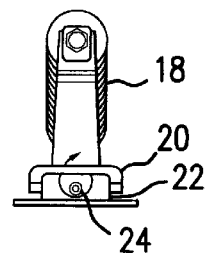
FIG. 3 is a side view of the segmental impact idler of the conveyor belt system illustrated in FIGS. 1 and 2.

The idler roll segments 14, 16, 18 can be raised or lowered by rotating the cam shaft 24. A rotation of roughly 90 degrees counter-clockwise lifts the idler roll segments 14, 16, 18 causing the idler roll segments to be clamped into place, as shown in FIG. 1. A rotation of roughly 90 degrees clockwise, as indicated by the arrow in FIG. 3, lowers the idler roll segments 14, 16, 18, preferably about 0.5 inch (1.27 cm) allowing the idler roll segments to slide across the slider base 20, as indicated by the arrows in FIG. 2, in a direction perpendicular to the direction in which the conveyor belt 12 travels. Lowering the idler roll segments 14, 16, 18 causes adjacent idler rolls of the conveyor belt system 10 to support the conveyor weight while the idler roll segments can be removed for servicing.

Figure 4:
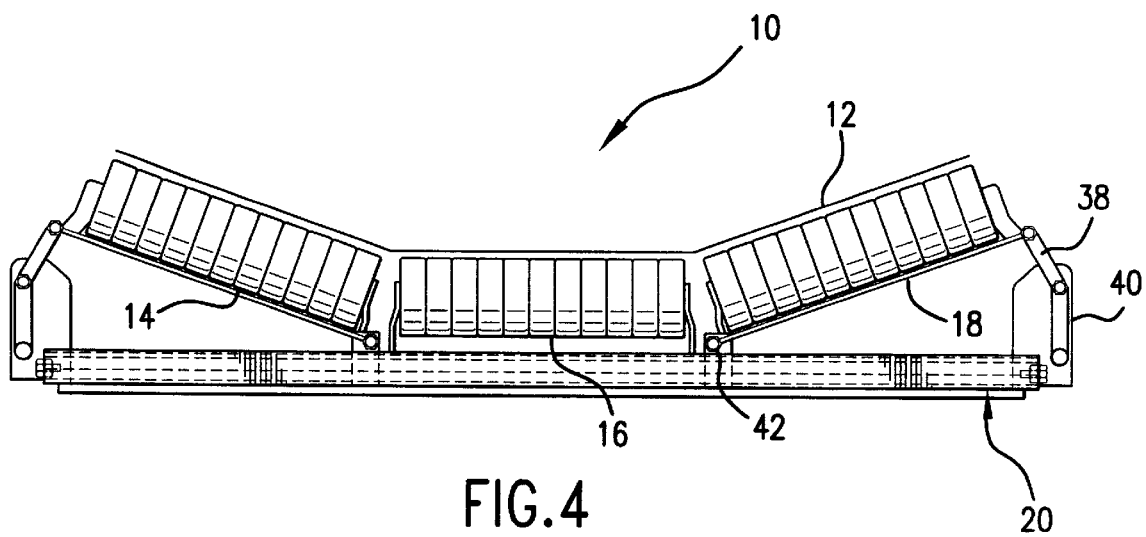
FIG. 4 is a front view of a segmental impact idler of a conveyor belt system using an alternative embodiment of the invention.
Figure 5:
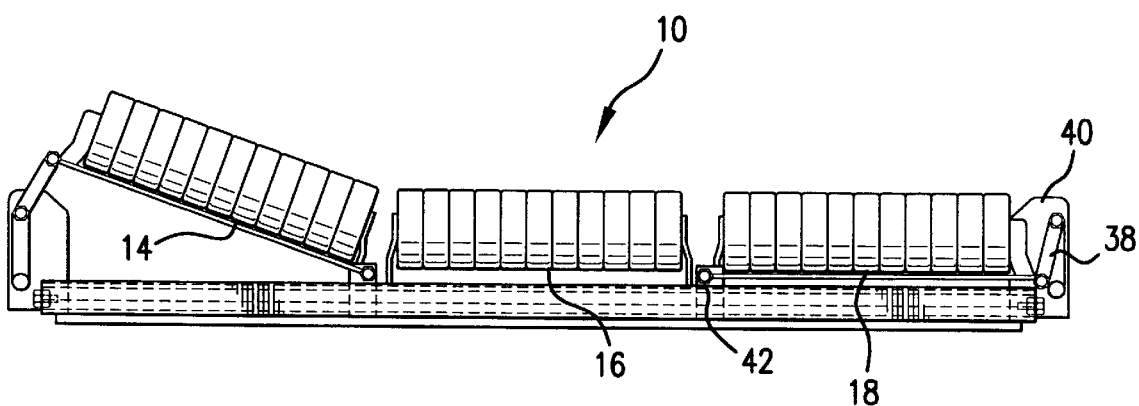
FIG. 5 is a front view of a segmental impact idler of a conveyor belt system using an alternative embodiment of the invention, illustrating the system in a disassembled state.
Figure 6:
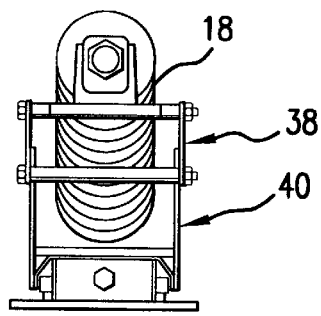
FIG. 6 is a side view of the segmental impact idler of the conveyor belt system illustrated in FIGS. 4 and 5.

An alternative embodiment of the invention is shown in FIGS. 4–6. This embodiment further comprises a mechanical linkage 38 and a supporting end bracket 40 that allow one of the wing rolls 18 to be lowered to an angle θ of roughly 0°. FIG. 4 shows the idler roll segments 14, 16, 18 prior to lowering the wing roll 18. FIG. 5 shows the idler roll segments 14, 16, 18 with one of the wing rolls 18 in a lowered position.

The mechanical linkage 38 can be adjusted using a wrench to lower the wing roll 18, thereby allowing the wing roll to rotate on a pin 42 located on the base 20. When the wing roll 18 is lowered, the adjacent idler roll segments of the conveyor belt system 10 support the conveyor weight formerly resting on the wing roll 18. By lowering all three of the idler roll segments 14, 16, 18 using the cam shaft, as described above, all three of the idler roll segments can slide out from underneath the conveyor belt 12 toward the side on which the wing roll 14 at an angle θ of greater than 0° is located. This will allow servicing from one side of the conveyor belt 12.

The mechanical linkage 38 and end bracket 40 can be located on just one wing roll 18 or on both wing rolls 14, 18, thereby allowing the idler roll segments 14, 16, 18 to be removed from either side of the conveyor belt system 10. Furthermore, the mechanical linkage 38 can be used to lower the wing roll 18 either before or after all three of the idler roll segments have been lowered by a device such as the cam shaft 24.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A conveyor belt system, comprising:
   a conveyor belt;
   at least one idler roll segment;
   a slider base across which the at least one idler roll segment slides in a direction perpendicular to a direction in which the conveyor belt travels; and
   a cam shaft for raising and lowering the at least one idler roll segment.

2. The conveyor belt system of claim 1 wherein the cam shaft extends substantially an entire length of the base.

3. The conveyor belt system of claim 1 wherein the cam shaft is mounted internally within the slider base.

4. The conveyor belt system of claim 1 wherein the cam shaft comprises a lobe under each end of each idler roll segment.

5. The conveyor belt system of claim 1 comprising three of the idler roll segments.

6. The conveyor belt system of claim 5 wherein the three idler roll segments comprise two wing rolls and a center roll between the wing rolls.

7. The conveyor belt system of claim 1 wherein the cam shaft comprises apparatus capable of lowering the at least one idler roll segment by about 0.5 inch to a height that allows the at least one idler roll segment to slide across the slider base.

8. The conveyor belt system of claim 1 further comprising an adjustable mechanical linkage at a first end of the at least one idler roll segment and a pin at a second end of the at least one idler roll segment.

9. A segmental impact idler, comprising:
   at least two idler roll segments;
   a slider base across which the idler roll segments slide; and
   a cam shaft for raising and lowering the idler roll segments.

10. The segmental impact idler of claim 9 wherein the cam shaft extends substantially an entire length of the base.

11. The segmental impact idler of claim 9 wherein the cam shaft is mounted internally within the slider base.

12. The segmental impact idler of claim 9 wherein the cam shaft comprises a lobe under each end of each idler roll segment.

13. The segmental impact idler of claim 9 wherein the cam shaft comprises apparatus capable of lowering the idler roll segment by about 0.5 inch to a height that allows the at least one idler roll segment to slide across the slider base.

14. The segmental impact idler of claim 9 further comprising an adjustable mechanical linkage at a first end of at least one of the idler roll segments and a pin at a second end of the at least one of the idler roll segments.

15. A segmental impact idler, comprising:
   a center roll segment;
   two wing roll segments, with one wing roll segment on either side of the center roll segment;
   a slider base across which the center roll segment and the wing roll segments slide; and
   a cam shaft for raising and lowering the center roll segment and the wing roll segments.

16. The segmental impact idler of claim 15 wherein the cam shaft comprises a lobe under each end of each roll segment.

17. The segmental impact idler of claim 15 wherein the cam shaft comprises apparatus capable of lowering the roll segments by about 0.5 inch to a height that allows the at least one idler roll segment to slide across the slider base.

18. The segmental impact idler of claim 15 further comprising an adjustable mechanical linkage at a first end of at least one of the wing roll segments and a pin at a second end of the at least one of the wing roll segments.

* * * * *